United States Patent [19]

Fish

[11] Patent Number: 4,644,610
[45] Date of Patent: Feb. 24, 1987

[54] DISC SHAPED HOLDER WITH AN EXPANDABLE CENTER HOLE

[76] Inventor: Ivan L. Fish, 2804 Carolina NE., Albuquerque, N. Mex. 87110

[21] Appl. No.: 647,973

[22] Filed: Sep. 6, 1984

[51] Int. Cl.[4] .................................................. F16L 3/08
[52] U.S. Cl. ................................ 24/30.5 S; 211/70.6; 211/89; 248/309.1
[58] Field of Search ............... 211/70.6, 89, 60.1; 248/309.1, 314; 24/30.5 S, 30.5 P, 563

[56] References Cited

U.S. PATENT DOCUMENTS

| | | | |
|---|---|---|---|
| 3,170,213 | 2/1965 | Thomas | 24/30.5 S X |
| 3,257,695 | 6/1966 | Frame | 24/30.5 S |
| 4,138,055 | 2/1979 | Harrison | 248/309.1 X |
| 4,267,995 | 5/1981 | McMillan | 24/30.5 S X |
| 4,505,006 | 3/1985 | Andre | 24/16 PB |

FOREIGN PATENT DOCUMENTS 1234618  2/1967  Fed. Rep. of Germany ... 24/30.5 S

Primary Examiner—Robert W. Gibson, Jr.
Attorney, Agent, or Firm—Samuel M. Freund

[57] ABSTRACT

A disc shaped holder device with an expandable center hole wherein the invention has a circular bead around its circumference and an internal centrally located access hole of convenient diameter, and an internal membrane completely filling the area between the bead and the central access hole, and wherein the membrane is cut radially from the access hole to, but not through, the bead causing the membrane to be shaped into truncated pie shaped panels; wherein the invention is used singly for securing plastic bags and the like in a reuseable fashion, and wherein the invention can be used in rows in a multiple configuration as a tool or utensil holder, or wire and cable separators; and wherein the device can be incorporated into a three dimensional body such as a sphere or ellipsoid and used for ornaments; and wherein the device can be incorporated into a lid or cover for a variety of bodies to form miniature greenhouses or frost and insect protectors.

7 Claims, 8 Drawing Figures

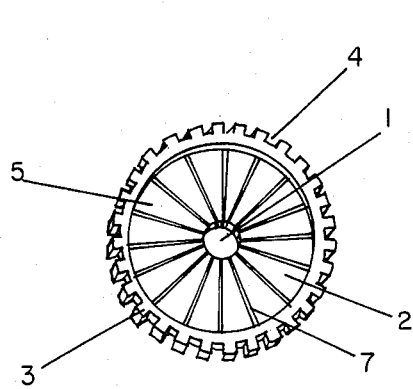
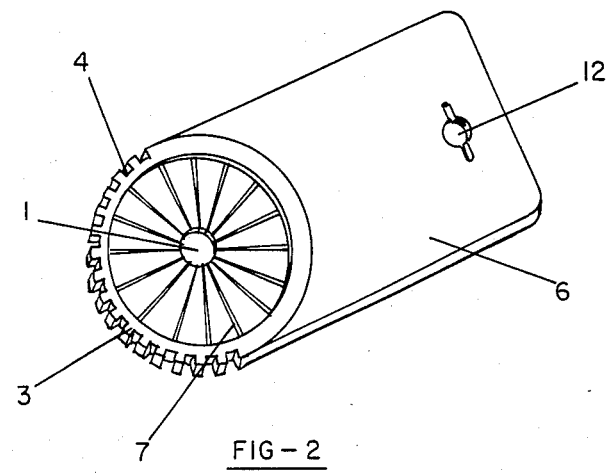
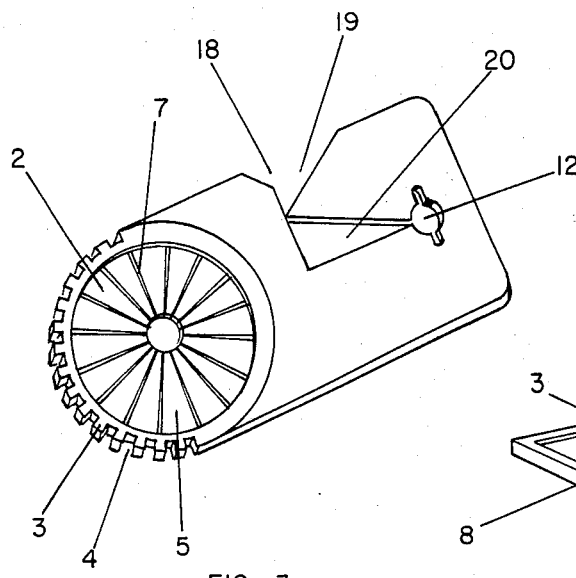
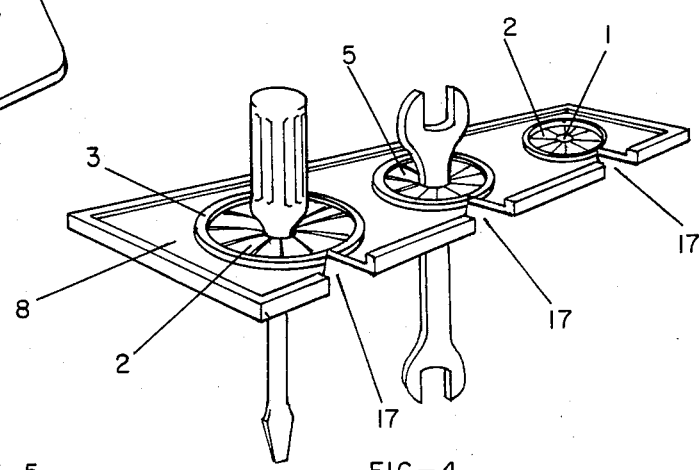
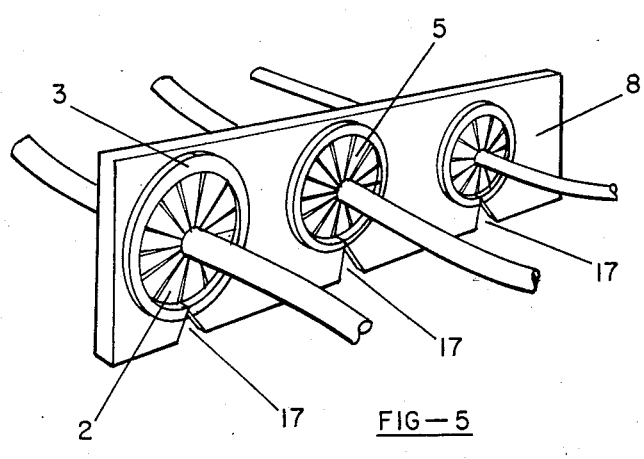

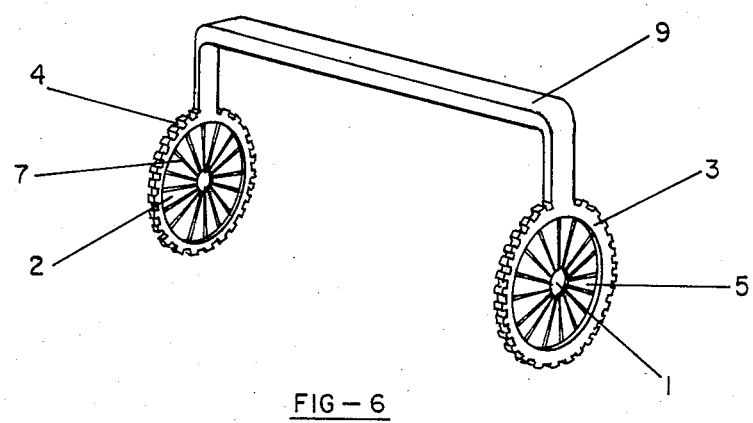
FIG—6
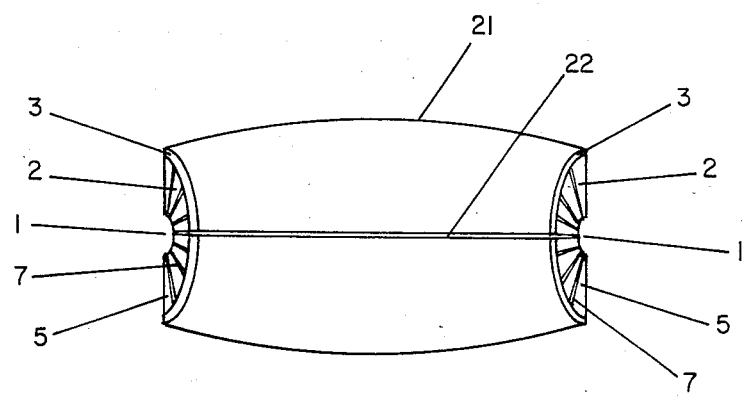
FIG—7
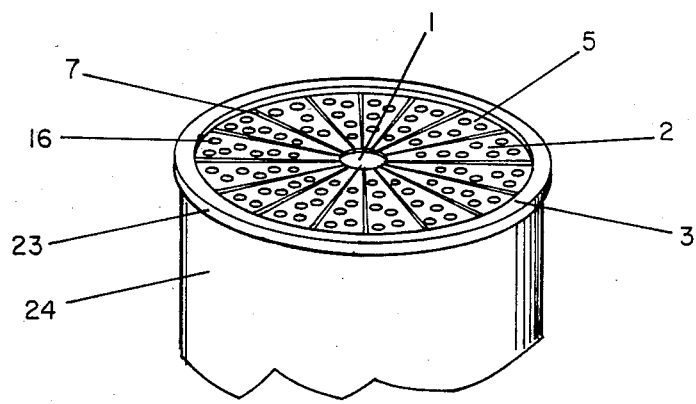
FIG—8

DISC SHAPED HOLDER WITH AN EXPANDABLE CENTER HOLE

BACKGROUND

1. Field of the Invention

This invention relates generally to separating and closure means, and more particularly to a reuseable means for securing flexible containers such as plastic bags and the like, and for holding items such as tools, utensils, wires, and cables in a desired location and spacing, and for covering a container yet allowing limited access to other items and substances to be placed into the container without removing the cover.

2. Description of the Prior Art

Securing flexible bags has developed over the years from string ties on burlap bags to coated wires currently used on plastic bags containing, for example, a loaf of bread. A small plastic clip with a center hole and an access slot through which the open end of a plastic bag can be slipped, has also become very common. To hold and separate wires, plastic clip-on devices are common in automobile ignition systems. These clip-on devices are generally a series of "C" shaped semi-rigid devices to hold ignition wires apart from each other and away from hot exhaust manifold parts. Tool and utensil holders have varied from a piece of flexible strap fastened at various points to a length of shelving or to a board, to a plurality of holes drilled into a shelf. There is a "sock sorter" available on the market which has a circular bead and a plurality of pie shaped holding fingers extending into the center. These sock holders are unsatisfactory because the socks become entangled and snagged in the sock sorter. The holding fingers do not sufficiently fill the entire space between the central access hole and the bead; but instead there is too much space left between the fingers for the material of the socks to occupy and become ensnared.

SUMMARY

The invention is very inexpensive, thus within the means of virtually everyone, and is quite reuseable. The invention can be used for a variety of purposes, but will generally be used to secure flexible items, to hold items in their place, or as ornaments, decorations, or means for attaching items and substances to another item. The invention can be used as a tool holder, wire separator, a device for hanging items on a clothesline, an insect trap, and Christmas tree ornaments. The device can also be used as a cover for a container to form a minature greenhouse. The device can be made of a large variety of substances and in any color or combinations of colors. The device can be made in small sizes, or as large as is desired.

BRIEF DESCRIPTION OF THE DRAWINGS

FIG. 1 is an isometric view of the basic invention.

FIG. 2 is an isometric view of the invention with a labeling tag.

FIG. 3 is an isometric view of the invention with a labeling tag with a double lock access.

FIG. 4 is an isometric view of the invention arranged three in a plate.

FIG. 5 is an isometric view of the invention arranged three in a plate for separating wires or cables. FIG. 6 is an isometric view of the invention showing two discs arranged parallel to each other with a support handle interconnecting. FIG. 7 is an isometric of the invention formed in a three dimensional body. FIG. 8 is an isometric view of the invention used as a cover to a container.

DESCRIPTION OF THE PREFERRED EMBODIMENT

The basic configuration of the invention is shown in FIG. 1. The invention is shown to be a disc shaped holder with a center access hole 1 and a membrane 2 which fills all the space between an outer circumferential bead 3 and the center access hole 1. The circumferential bead 3 has substantial thickness transverse to the plane of the disc primarily for rigidity. The bead 3 has serrations or striations 4 on its exterior for grasping. The membrane 2 is relatively thin and has slits 7 radially from the center of the invention forming the membrane 2 into truncated pie shaped panels 5. The panels 5 are resilient and when bent by an object being forced into the access hole 1, will return to their normally flat configuration when the object is removed. Because there is little or no space between the panels 5 when the panels 5 are flat, there is correspondingly very little space between the panels 5 when an object is inserted into the access hole 1, and consequently the object inserted into the access hole 1 will be tightly secured and less likely to become entangled in the invention than if there were significant spacing between the panels 5. In this configuration, the invention can be used for sealing plastic bags, or for holding a pair of socks or a towel. The object inserted can be extracted from the device by pulling the object through the access hole 1 in the same relative direction as when inserted. If the object is too bulky to be drawn through the invention, such as a plastic bag containing a loaf of bread, the plastic bag can be withdrawn by pulling it out in a reverse relative direction because of the flexibility of the panels 5. The invention may be made in a variety of colors and the user can devise a color code system for storing objects in opaque bags.

FIG. 2 shows the invention in another configuration, wherein a writing or labeling tag 6 is formed integral with the disc shaped holder. The labeling tag 6 is approximately the same thickness as the membrane 2. The tag 6 can be either smooth on both surfaces or striated on one or both surfaces, to allow for writing thereon or for affixing a gummed label therto. The tag 6 is made integral with and a part of the bead 3 attaching to the exterior of said bead 3 and extending away from the center of the disc shaped holder. The exterior shape of the labeling tag 6 is that it has essentially two flat surfaces and that its exterior boundry encloses sufficient area on which to write or affix a gummed label. While the labeling tag 6 is shown to be rectangular, it may have any desired shape as determined by aesthetics, economics, and utility. The labeling tag 6 is also shown to have a hanging hole 12, and the hanging hole 12 may have any desireable shape and size. The configuration shown in FIG. 2 has great utility in that bagged objects can be labeled or marked on the labeling tag 6 to show the price, weight, identification, and a coded price marking for automatic price readers now common in stores.

A third configuration is shown in FIG. 3. In this configuration the labeling tag 6 is very similar to the labeling tag 6 shown in the previous configuration, except that in this configuration the labeling tag 6 contains a double lock slot 18 which provides double secure access to the hanging hole 12. The double lock slot 18 is comprised of a first "V" shaped access slot 19 whose widest opening is on the edge of the tag 6 and whose vertex is on a corner of an access triangle 20. The access triangle 20 has another corner at hanging hole 12 in the labeling tag 6. This configuration provides a means to easily hang the invention with an object inserted in the access hole 1, from a clothesline without significant possibility of the device becoming dislodged accidentally or by the wind. This configuration also provides an easy means of removing the device from a clothesline by intentionally moving the device so that the clothesline is forced out the double lock slot 18. A typical use would be to place a pair of soiled socks immediately after use, into the disc shaped holder, and deposit the holder and socks into a clothes hamper. When the socks are to be washed, they are merely placed, while still in the holder, into the washing machine. After washing, the pair of socks in the holder are hung on a clothesline by snapping the clothesline past the double lock slot 18 into the hanging hole 12. When the socks are dry, the holder is removed from the clothesline and the holder with socks still in the access hole 1, are then placed in the user's drawer awaiting the next use. Time wasted by searching for a mate to a sock, folding or rolling socks and multiple handling of two socks instead of a pair are all saved.

FIG. 4 shows three disc shaped holders in one plate 8 as an item separator being used to hold tools and implements or utensils. This configuration has a single lock slot 17 through the plate 8 from the edge to one of the slits 7 in the disc. The single lock slot 17 is "V" shaped having the widest point of the "V" at the edge of the plate 8 and the vertex of the "V" at the circuference of the bead 3 of the disc shaped holder. Thus an implement may be inserted directly into the disc shaped holder or through the single lock slot 17 and will be retained and secured by the closed vertex of the "V" shaped single lock slot 17 and panels 5. This tool holder configuration can also be used to hold jars, cans and bags as in a spice closet, as well as tools in a work bench area. It is not necessary that the number of disc shaped holders in plate 8 be limited to three as shown, and any number desired could be formed into one plate 8. For that matter, the number of rows of disc shaped holders in a single plate could, if desired, be more than one.

FIG. 5 shows the plate 8 with three disc shaped holders therein being used as wire or cable separators.

FIG. 6 shows two disc shaped holders whose planes are transverse to a line between their centers, connected at the beads 3 by a support handle 9. This configuration is useful as an item carrier, especially rod or tubular shaped items. Such items as poster or drawing tubes, pipe or rebar can be inserted through both of the disc shaped holders so that the center of gravity of the item to be carried is between the two disc shaped holders, and the item carried by the support handle.

FIG. 7 shows that the disc shaped holders can also be formed into a three dimensional body 21. In this configuration, the body 21 has formed therein, two disc shaped holders on diametrically opposite sides of the body 21, and a connecting slot 22 in the body 21, passes through one side of the beads 3 of each disc shaped holder and connects with a slit 7 in each disc shaped holder. The body 21 is made of resilient material such as plastic and synthetic rubber compounds, as are the disc shaped holders, and the disc shaped holders are made integral with the body 21. By squeezing the body 21 at points generally diametrically opposite each other but generally adjacent to the disc shaped holders, the connecting slot 22 will open like a pair of jaws. Once opened, the device can be attached to a long member such as a wire, rope, branch of a tree or other items shaped as a line. This device would be very useful as Christmas tree ornaments, line or rope distance markers, or even as floats in swimming pools or on fishing lines. This configuration can also be used as a bag sealer, neckerchief slip noose, or it can be filled with pesticide or adhesive and used as an insect trap. It can also be used as coin holders, clothespins, or containers for air freshners. This configuration is shown as having an approximately ellipsoidal body 21; however the body could be approximately spherical, or even shaped into most other three dimensional geometric forms FIG. 8 shows the basic configuration slightly modified. As shown in FIG. 8, the bead 3 is also formed to have a lip 23 which is used to secure the disc shaped holder to a container or open bottom jagged skirt 24. In this configuration the disc shaped holder is made of a clear or transparent plastic which allows sunlight to pass through. The panels are very flexible and each panel has a multiplicity of perforations 16 to allow watering, and the device is used as a cover for seeds and small plants, acting to allow sun penetration and prevent early spring frost and insect damage. As a minature greenhouse, the device allows the seedlings to grow up through the very flexible panels 5. The device can have a container 24 with a bottom into which soil can be placed and water can be introduced directly through the access hole 1 and the perforations 16. The device can also have a bottomless jagged skirt 24 which is placed over existing plants and stuck into the soil as a frost and insect protector and water added as before stated.

The invention in all of the configurations can be made of any semi-rigid, resilient material, but for economic reasons, ease of manufacture, light weight, and durability it has been found that plastics, including thermoplastics, wood fiber materials, and synthetic rubber compounds are very satisfactory. Among the plastics and thermoplastics, polyvinyl chloride, polyethylene, polyesters, polypropylenes and polyurethanes have all worked well. Wood fiber materials are those such as glazed or unglazed pasteboard, cardboard or even heavy duty paper.

I claim:

1. A disc shaped holder comprising: a generally circular bead around a central membrane, said central membrane having an access hole centrally located and further having a plurality of narrow slits radially disposed from the access hole to the bead, wherein the bead has a significant thickness compared to the membrane, wherein the bead has on its exterior circumference means to support the holder and the article placed therein, said support means comprising serrations or striations for facilitating grasping the disc shaped holder, and wherein the slits in the membrane form truncated pie shaped portions of the membrane which remain attached to the bead on its interior circumference.

2. The disc shaped holder of claim 1 wherein the means to support the disc shaped holder further comprise:

serrations or striations on the exterior surface of the bead, and a labeling tag which is a generally flat and rectangular tab whose plane is the same as the plane of the bead and which is made integral with the bead, and wherein a hanging hole may be placed in the labeling tag, to enable hanging of the holder from an open ended support such as a nail.

3. The disc shaped holder of claim 1 wherein the means to support the disc holder further comprises:

serrations or striations on the exterior surface of the bead, and a labeling tag which is a generally flat and rectangular tab whose plane is the same as the plane of the bead and which is made integral with the bead, and wherein the labeling tag has therein a hanging hole, and wherein a double lock slot connects the edge of the labeling tag to the access hole, and wherein the double lock slot comprises a first "V" shaped slot whose widest portion is at the edge of the labeling tag, and a second triangular slot, one vertex of which is at the vertex of the "V" shaped slot, and another vertex of the triangular slot connects to the hanging hole, wherein the disc shaped holder may be securely hung by the hanging hole on a closed ended support such as a loop.

4. A disc shaped holder comprising:

a generally circular bead around a central membrane, said membrane having an access hole centrally located, and said membrane having a plurality of narrow slits radially from the access hole to the interior circumference of the bead, and wherein the bead has a significant thickness compared to the membrane and wherein the bead has on its exterior circumference a serrated or striated surface, and wherein the slits in the membrane form truncated pie shaped portions of the membrane which remain attached to the interior circumference of the bead, and wherein a labeling tag is made integral with and affixed to a portion of the exterior circumference of the bead, and wherein a hanging hole may be placed in the labeling tab.

5. A disc shaped holder comprising:

a generally circular bead around a central membrane, said central membrane having an access hole centrally located, and the said membrane having a plurality of narrow slits radially from the access hole to the bead, wherein the bead has a significant thickness compared to the membrane and wherein the bead has on its exterior circumference a serrated or striated surface, and wherein the slits in the membrane form truncated pie shaped portions of the membrane which remain attached to the interior circumference of the bead and wherein a labeling tag is made integral with and affixed to a portion of the exterior circumference of the bead, and wherein the labeling tag has therein a hanging hole, and wherein a double lock slot connects the edge of the labeling tag to the access hole, and wherein the double lock slot comprises a first "V" shaped slot whose widest portion is at the edge of the labeling tag, and a second triangular slot, one vertex of which is at the vertex of the "V" shaped slot, and another vertex of the triangular slot connecting to the hanging hole.

6. The holder of claim 4 which is made of a material selected from the group comprising polyethylene, polyvinyl chloride, polyesters, and polyurethanes, polypropylenes, wood fiber materials, and synthetic rubber compounds.

7. The holder of claim 5 which is made of a material selected from the group comprising polyethylene, polyvinyl chloride, polyesters, and polyurethanes, polypropylenes, wood fiber materials, and synthetic rubber compounds.

* * * * *